(12) United States Patent
Sasaki et al.

(10) Patent No.: US 12,147,618 B2
(45) Date of Patent: Nov. 19, 2024

(54) ACOUSTIC EFFECT PLAYBACK DEVICE HAVING A ROTARY OPERATOR

(71) Applicant: AlphaTheta Corporation, Yokohama (JP)

(72) Inventors: Kenji Sasaki, Yokohama (JP); Syusuke Fujiwara, Yokohama (JP); Nao Takagi, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 287 days.

(21) Appl. No.: 17/619,813

(22) PCT Filed: Jun. 19, 2019

(86) PCT No.: PCT/JP2019/024256
§ 371 (c)(1),
(2) Date: Dec. 16, 2021

(87) PCT Pub. No.: WO2020/255288
PCT Pub. Date: Dec. 24, 2020

(65) Prior Publication Data
US 2022/0350423 A1    Nov. 3, 2022

(51) Int. Cl.
*G10H 1/32*    (2006.01)
*G05G 1/10*    (2006.01)
*G06F 3/0362*    (2013.01)

(52) U.S. Cl.
CPC ............. *G06F 3/0362* (2013.01); *G05G 1/10* (2013.01); *G10H 1/32* (2013.01); *G10H 2210/241* (2013.01)

(58) Field of Classification Search
CPC ................... G06F 3/0362; G10H 1/34; G10H 1/0091–2210/241; G05G 1/08
See application file for complete search history.

(56) References Cited

U.S. PATENT DOCUMENTS 7,269,103 B2 *  9/2007  Kataoka ................. G11B 19/00
                                                              200/19.03
2012/0134513 A1    5/2012  Garet et al.

FOREIGN PATENT DOCUMENTS

EP      1 391 889 A2    2/2004
JP      2004-87192      3/2004
JP      2005-267812     9/2005
(Continued)

OTHER PUBLICATIONS

Extended European Search Report dated Dec. 23, 2022 issued in corresponding European Application No. 19933909.4; English text (9 pages).
(Continued)

*Primary Examiner* — Vanessa Girardi
(74) *Attorney, Agent, or Firm* — Rankin, Hill & Clark LLP

(57) ABSTRACT

An acoustic device includes a rotary operator and a base supporting the rotary operator so that the rotary operator is rotatable. The rotary operator includes a rotary body provided on the base, a pressed portion provided on the rotary body and on which a pressing operation is performed, a press detecting unit provided on the rotary body along an outer circumference of the rotary operator and configured to detect the pressing operation performed on the pressed portion, and elastic members interposed between the pressed portion and the press detecting unit.

7 Claims, 7 Drawing Sheets

(56) References Cited

FOREIGN PATENT DOCUMENTS

| WO | 2006/067933 | 6/2006 |
| WO | 2006/103904 | 10/2006 |

OTHER PUBLICATIONS

International Preliminary Report on Patentability dated Dec. 21, 2021, 7 pages.
International Search Report dated Aug. 27, 2019, Application No. PCT/JP2019/024256, 2 pages.

\* cited by examiner

FIG.4
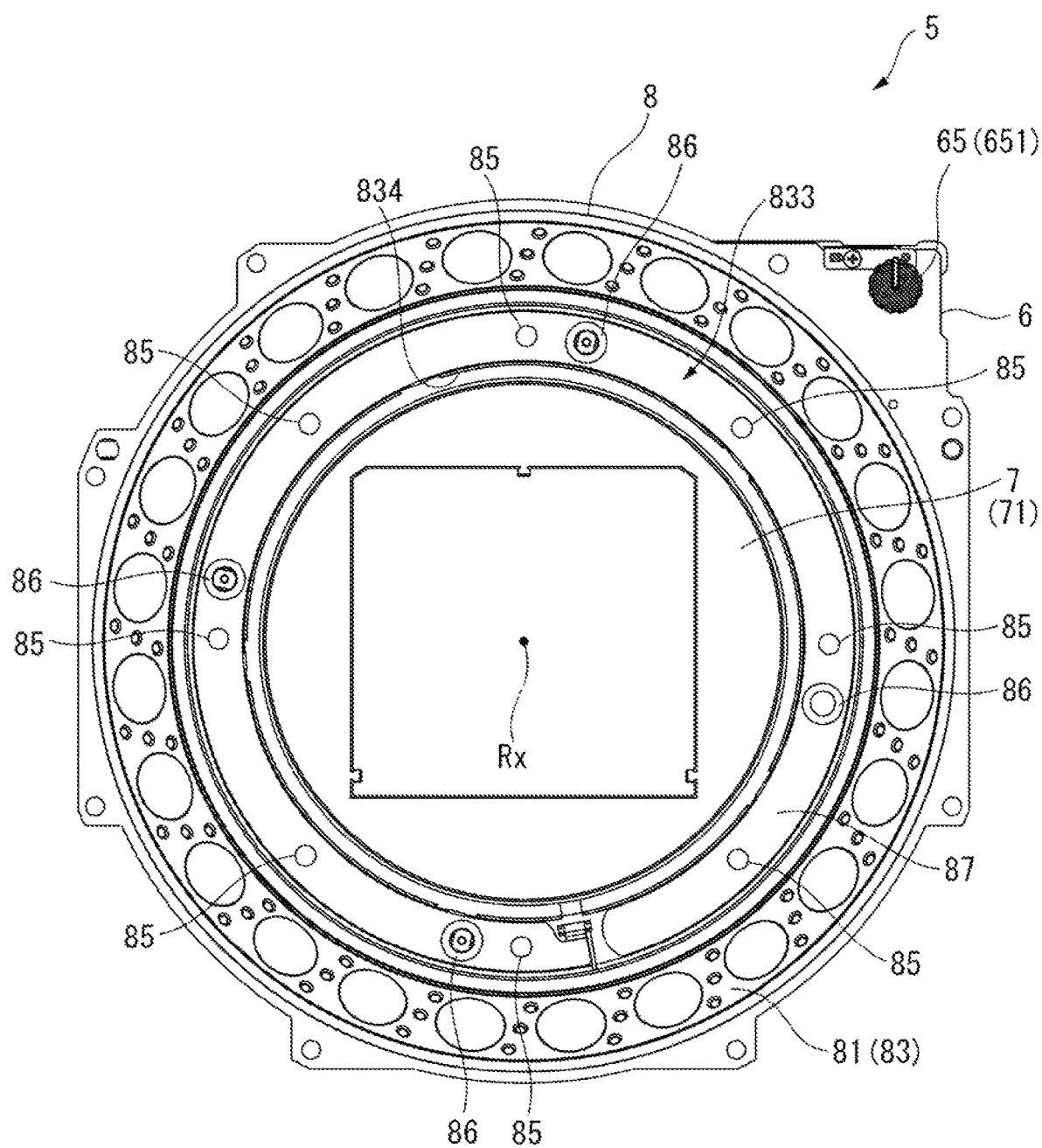
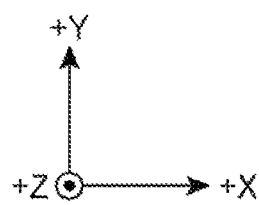

FIG.6
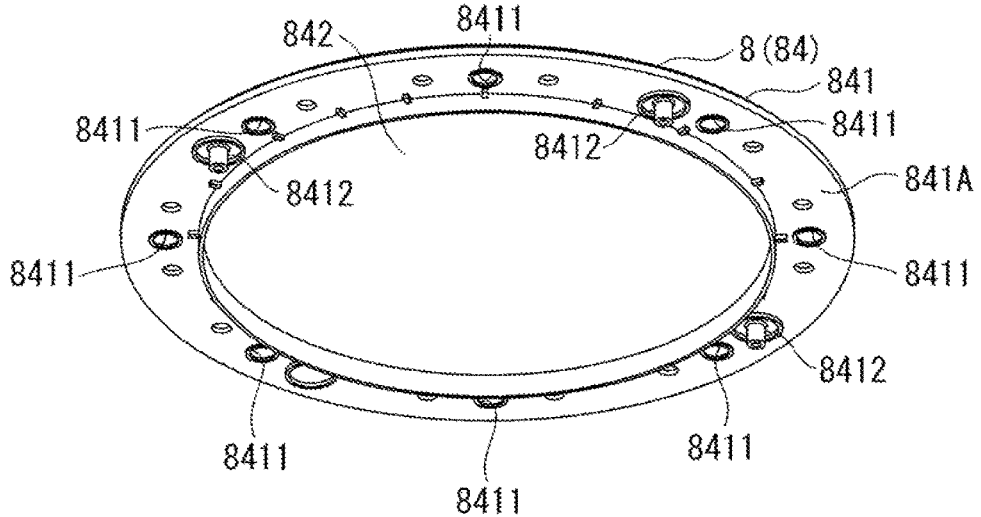
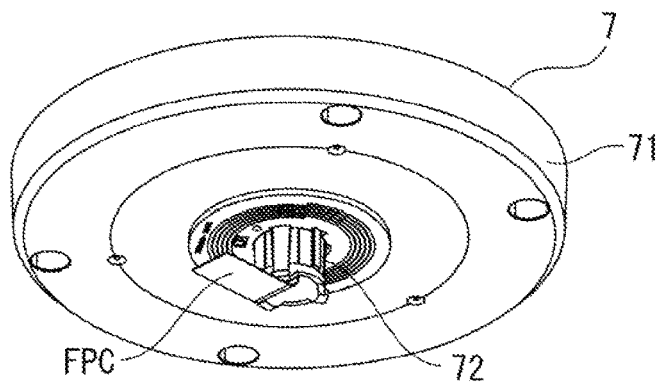
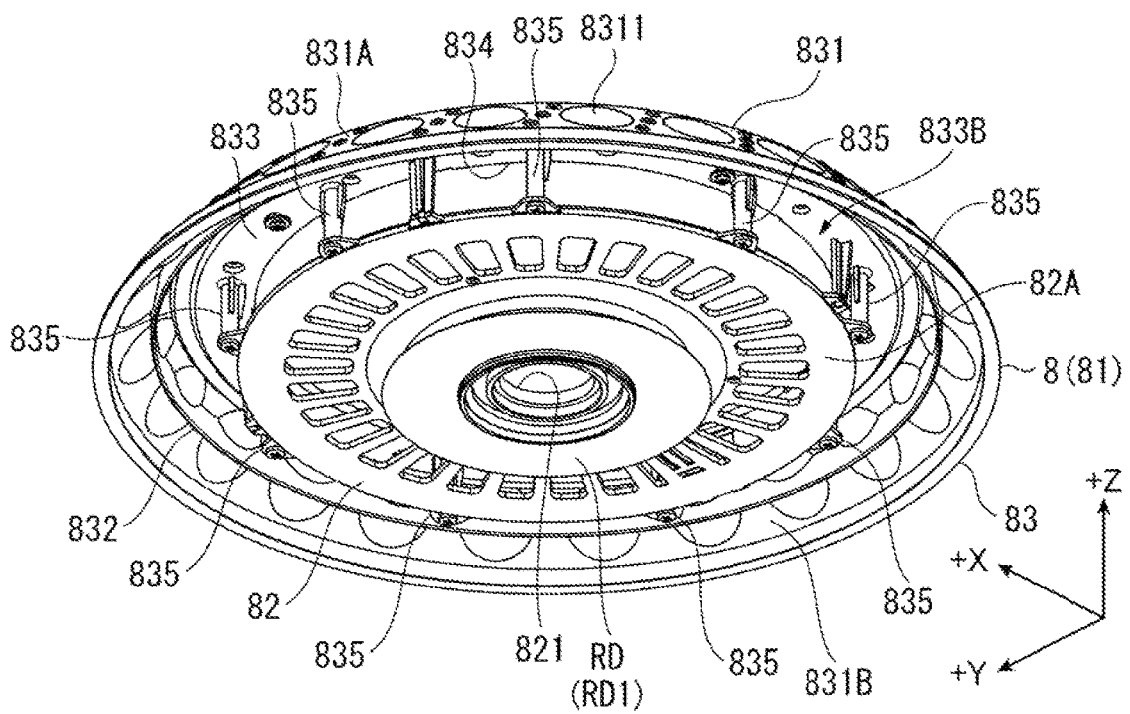

ACOUSTIC EFFECT PLAYBACK DEVICE HAVING A ROTARY OPERATOR

TECHNICAL FIELD

The present invention relates to an acoustic device.

BACKGROUND ART

There has been typically known a playback system including an output unit and an information processing device and configured to play sound information on music and sound as well as image information (see, for instance, Patent Literature 1).

In the playback system described in Patent Literature 1, the information processing device is a playback device for a Disc Jockey (DJ) and includes a switch device. The switch device is shaped to resemble a turntable in a record player and variably sets a playback speed and a playback direction of music information, and a playback state (e.g., stop or restart of playback) of the music information. The switch device includes: a rotary body section having a jog table and a jogging portion; a shaft-supporting base; and a movement condition detector.

Among these components, the movement condition detector includes a rotational movement detecting unit for detecting a rotary operation performed on the rotary body section by a user, and a press detecting unit for detecting a pressing operation performed on the rotary body section by the user. The movement condition detector outputs a signal about the detected movement condition of the rotary body section.

The press detecting unit includes a tape-shaped switch disposed on a base of the shaft-supporting base supporting the rotary body section so that the rotary body section is rotatable. When the rotary body section is pressed to cause the switch to be closed by a pressing bulge that is pressed down along with the jog table, the press detecting unit detects that the rotary body section has been pressed.

CITATION LIST(S)

Patent Literature(s)

Patent Literature 1 International Publication No. WO2006/103904

SUMMARY OF THE INVENTION

Problems to be Solved by the Invention

However, in the information processing device described in Patent Literature 1, since rollers for rotating the rotary body section and a roller-holding structure are disposed on the tape-shaped switch, the components disposed on the tape-shaped switch have a large weight. For this reason, when a large vibration acts on the information processing device due to music or the like played at a site where the information processing device is placed, the press detecting unit is likely to detect vibration as a pressing operation performed on the rotary body section. Accordingly, a detection sensitivity of the press detecting unit is forced to be lowered.

An object of the invention is to solve at least a part of the above-described problem. One of the object of the invention is to provide an acoustic device capable of improving a detection accuracy of the pressing operation.

Means for Solving the Problem

According to an aspect of the invention, an acoustic device includes: a rotary operator; and a base supporting the rotary operator so that the rotary operator is rotatable, the rotary operator including: a rotary body provided on the base; a pressed portion provided on the rotary body and on which a pressing operation is performed; a press detecting unit provided in the rotary body along an outer circumference of the rotary operator and configured to detect the pressing operation performed on the pressed portion; and an elastic member interposed between the pressed portion and the press detecting unit.

According to the acoustic device of the above aspect of the invention, a detection accuracy of the pressing operation performed on the pressed portion is improvable.

BRIEF EXPLANATION OF DRAWINGS

FIG. 4 is a plan view showing the jog controller from which a top plate removed in the exemplary embodiment.

FIG. 6 is another exploded perspective view showing the jog controller in the exemplary embodiment.

DESCRIPTION OF EMBODIMENT(S)

An exemplary embodiment of the invention will be described below with reference to the attached drawings.

Overall Configuration of Playback System

Figure 1:
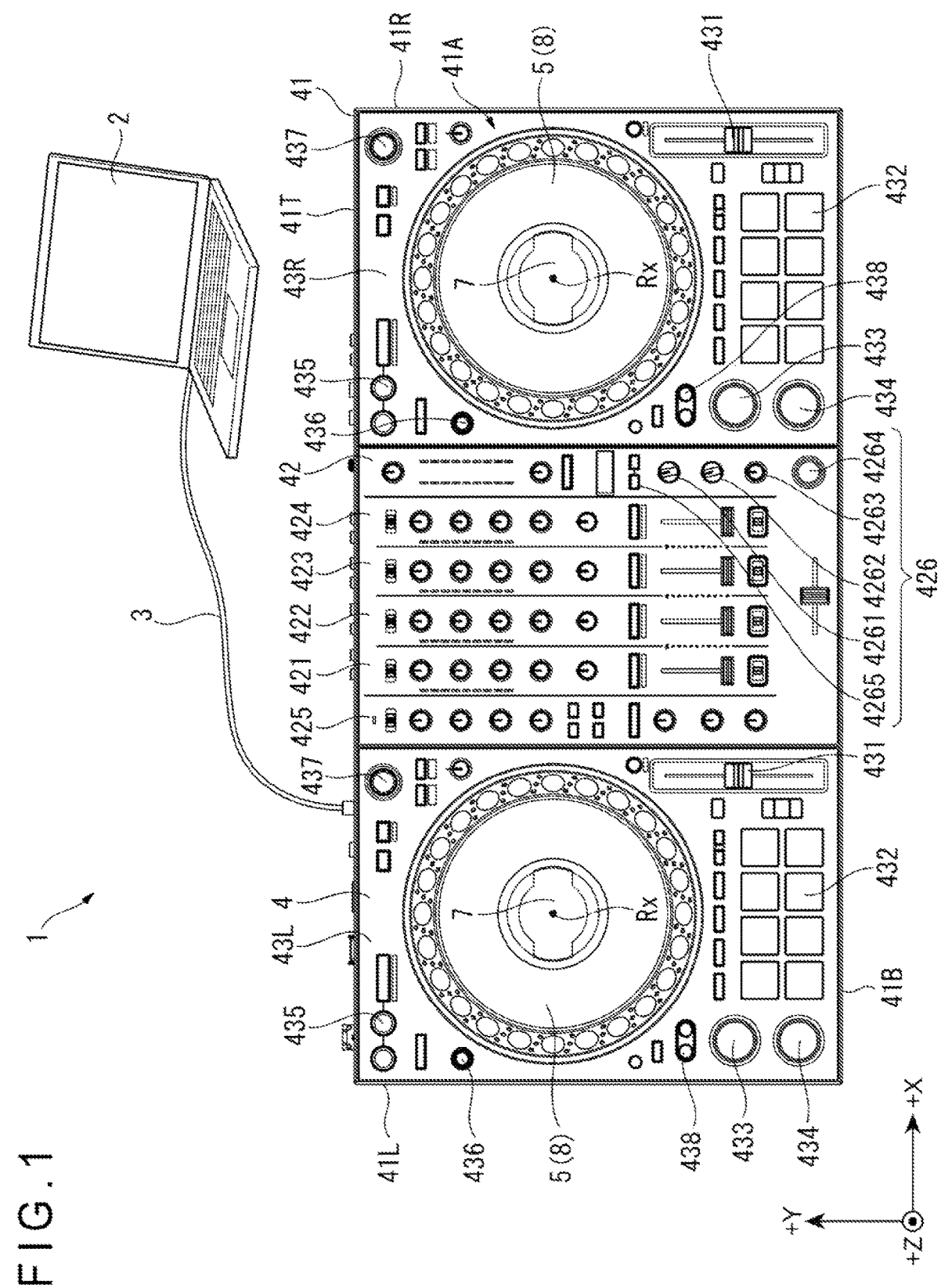
FIG. 1 is an illustration showing a playback system in an exemplary embodiment.

FIG. 1 is an illustration showing a playback system 1 according to the exemplary embodiment of the invention.

The playback system 1 according to the exemplary embodiment includes an information processing device 2, a DJ controller 4 connected to the information processing device 2, and a cable 3 connecting the information processing device 2 and the DJ controller 4, as shown in FIG. 1.

Configuration of Information Processing Device

The information processing device 2 plays audio data such as music piece data and outputs the audio data to the DJ controller 4 via a predetermined cable 3. A playback control signal is inputted from the DJ controller 4 to the information processing device 2 via the cable 3. In response to the inputted playback control signal, the information processing device 2 imparts various acoustic effects to the music piece data being played.

Such an information processing device 2 may be, for instance, a personal computer (PC). Specifically, the information processing device 2 is exemplified by a configuration including an arithmetic processor such as a Central Processing Unit (CPU) and a storage such as a Hard Disk Drive (HDD).

Overall Configuration of DJ Controller

The DJ controller 4 corresponds to an acoustic device. The DJ controller 4 includes a casing 41, and a mixer 42, a left deck 43L and a right deck 43R that are provided in the casing 41.

It should be noted that a concept of the acoustic device in the exemplary embodiment includes not only an audio playback controller but also an audio playback device for playing music piece data.

Details of Casing

The casing 41 includes a top surface 41A, an upper surface 41T, a lower surface 41B, a left surface 41L, a right surface 41R, and a bottom surface (not shown). The entire casing 41 is formed into a substantially rectangular parallelepiped shape.

The top surface 41A is a side of the casing 41 directed upward to face an operator when the DJ controller 4 is mounted on an installation surface.

The bottom surface is opposite to the top surface 41A in the casing 41. The bottom surface, although not shown, has a plurality of legs in contact with the installation surface.

The upper surface 41T and the lower surface 41B are opposite sides of the casing 41 in a lateral direction thereof. Specifically, when the casing 41 is viewed from a position facing the top surface 41A, the upper surface 41T in the casing 41 is placed far from the operator while the lower surface 41B in the casing 41 is close to the operator.

The left surface 41L and the right surface 41R are opposite sides of the casing 41 in a longitudinal direction thereof. Specifically, when the casing 41 is viewed from a position facing the top surface 41A with the upper surface 41T directed upward, the left surface 41L is on the left side of the casing 41 while the right surface 41R is on the right side of the casing 41.

The mixer 42 is disposed in the middle of the top surface 41A. The mixer 42 executes: switching audio data to be inputted from the information processing device 2; adjusting a sound volume of each of channels; and imparting acoustic effects. The mixer 42 includes four channel adjusters 421 to 424, a microphone adjuster 425, and an effector 426.

The effector 426 is provided in a lower right portion of the mixer 42, and imparts a musical sound effect to a music piece being played. The effector 426 includes an effect selection switch 4261, channel selection switch 4262, effect-amount adjusting switch 4263, effect imparting switch 4264, and beat change button 4265.

The left deck 43L is disposed on the top surface 41A on the left of the mixer 42. The right deck 43R is disposed on the top surface 41A on the right of the mixer 42. The left deck 43L and the right deck 43R impart various effects to audio data inputted from the information processing device 2, according to the operation by the operator.

The left deck 43L and the right deck 43R each include a jog controller 5, a tempo slider 431, a performance pad 432, a cue button 433, a play/pause button 434, a loop button 435, a deck selection button 436, a load button 437, and a cue/loop call switch 438.

The jog controller 5 includes a jog dial 8 rotatable centered on a rotation axis Rx extending along +Z direction. Fast-forwarding or reversing of the audio data to be played is executed through an operator's rotary operation on the jog dial 8.

The jog controller 5 includes a display 7 in the center as viewed from the +Z direction. The display 7 displays, for instance, a value of Beats Per Minute (BPM), a playback-elapsed time, a progression state, and a beat position of the audio data being played as well as a rotary state of an LP record at 33 PRM in accordance with the progression of the audio data being played.

Details of the jog controller 5 are described below.

The tempo slider 431 adjusts a tempo of the audio data to be played.

The performance pad 432 executes switching of effects on the audio data being played. The performance pad 432 includes a plurality of buttons. The effect, such as loop, cue, key shift, or sampler, is instantaneously added to the music data being played in response to an operator's pressing operation on one of the buttons.

The cue button 433 is a button for cueing a music piece to be played.

The play/pause button 434 is a button for starting playing of audio data or pausing the audio data being played.

The loop button 435 is a button for looping the audio data being played.

The deck selection button 436 is a button for selecting a channel of audio data to be played from among channel adjuster 421 to 424 of the mixer 42. In the exemplary embodiment, switching of the channel adjusters 421,422 can be executed in the left deck 43L, and switching of the channel adjusters 423,424 can be executed in the right deck 43R.

The load button 437 is a button for loading audio data from the information processing device 2. When the load button 437 is pressed after audio data to be played on the information processing device 2 is selected, the audio data is loaded to any of the channels of the channel adjuster 421 to 424.

The cue/loop call switch 438 is a switch for calling a cue point stored.

In the following, three directions orthogonal to each other are defined as +X direction, +Y direction, and +Z direction. The +Z direction is defined as a direction directed from the bottom surface to the top surface 41A. The +X direction is defined as a direction directed from the left surface 41L to the right surface 41R. The +Y direction is defined as a direction from the lower surface 41B to the upper surface 41T. Though not illustrated, a direction opposite to the +X direction is defined as −X direction, a direction opposite to the +Y direction is defined as −Y direction, and a direction opposite to the +Z direction is defined as −Z direction, for convenience of the explanation.

Details of Jog Controller

Figure 2:
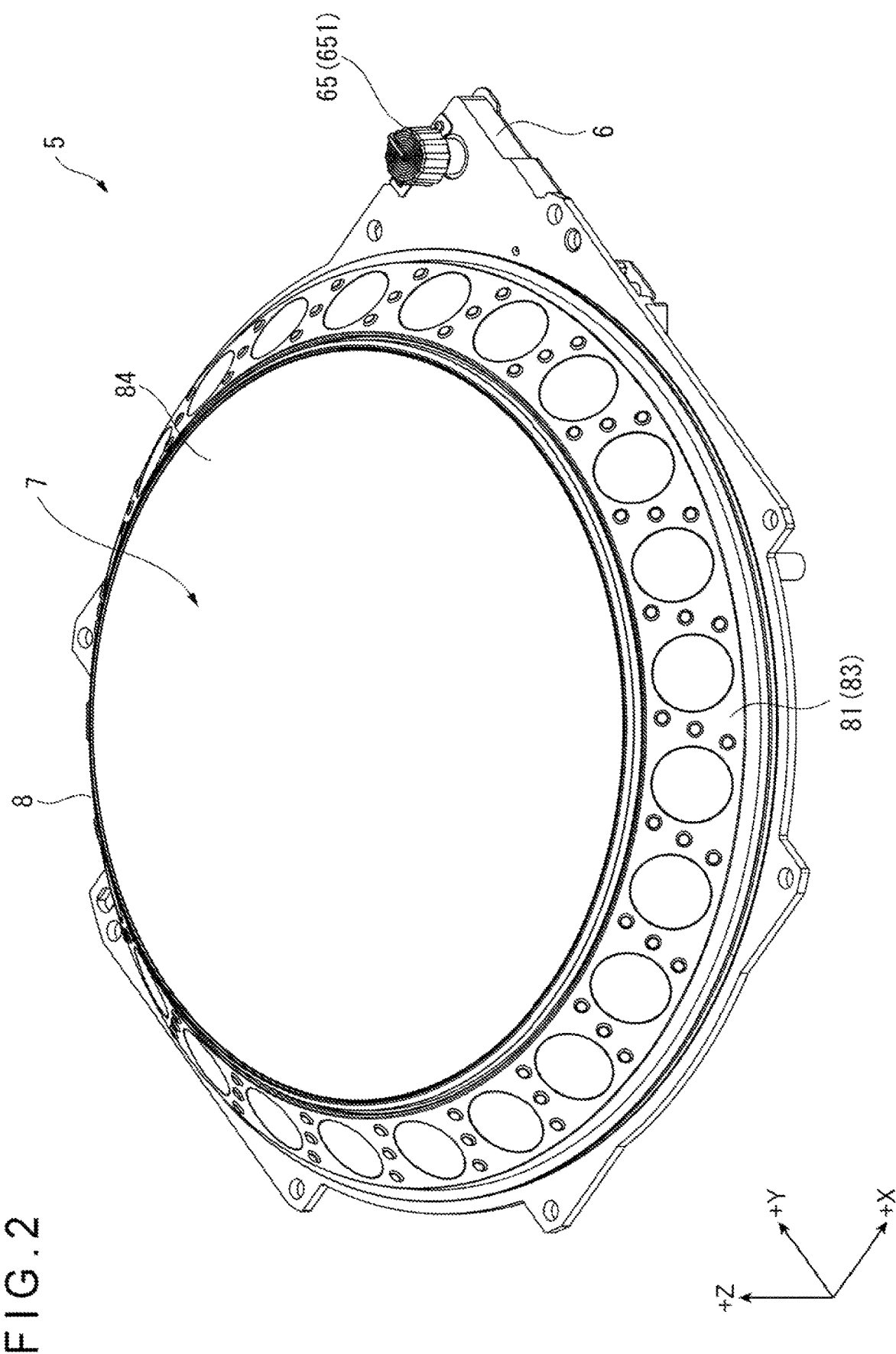
FIG. 2 is a perspective view showing a jog controller in the exemplary embodiment.

FIG. 2 is a plan view of the jog controller 5 as viewed from the +Z direction.

The jog controller 5 is a rotary operation device configured to output an operation signal for executing fast-forwarding or reversing of the audio data to be played, as described above. The jog controller 5 is provided in each of the left deck 43L and the right deck 43R in the casing 41. Each jog controller 5 includes the base 6, the display 7, and the jog dial 8 as shown in FIG. 2.

Details of Base

Figure 3:
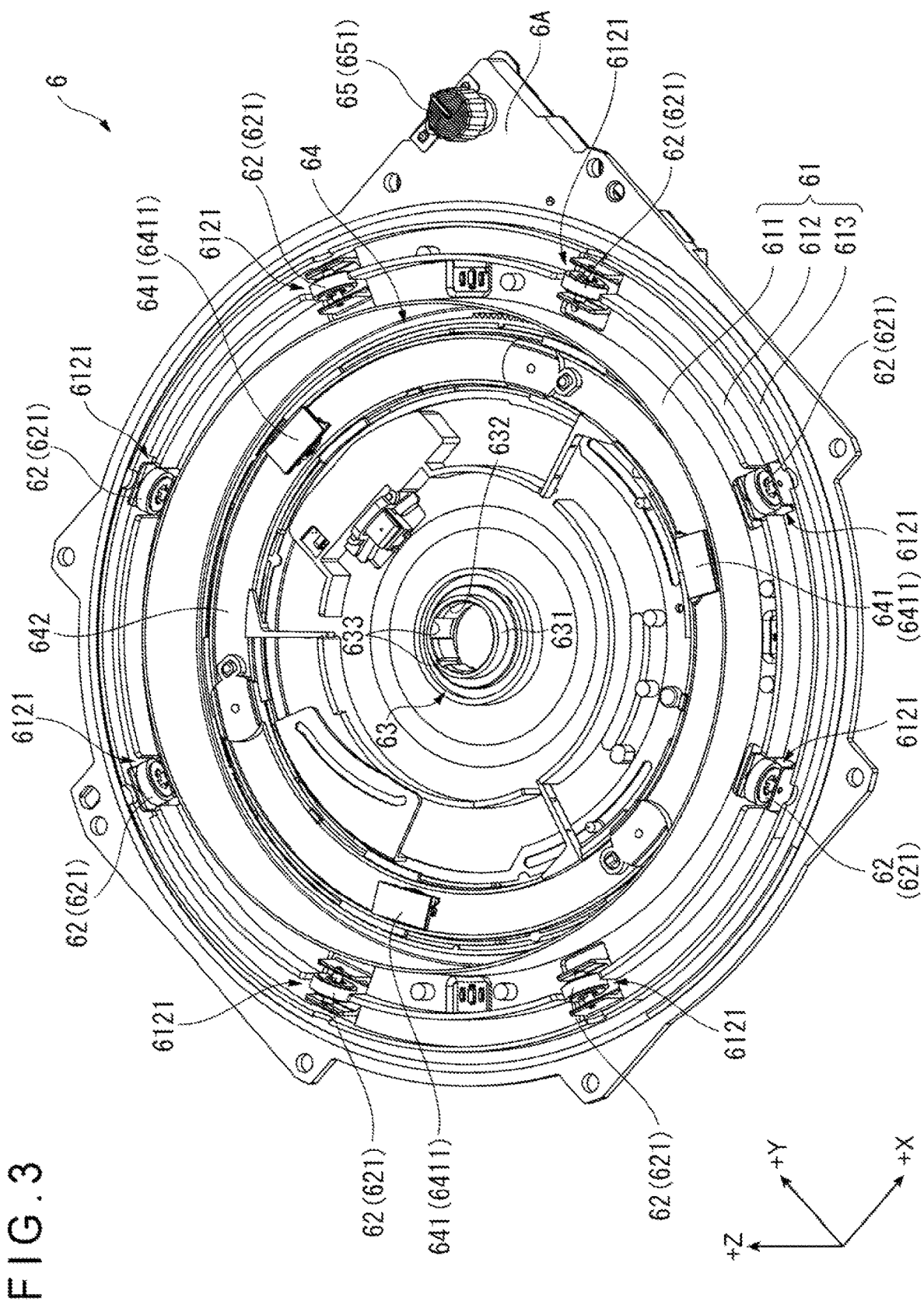
FIG. 3 is a perspective view showing a base in the exemplary embodiment.

FIG. 3 is a perspective view of the base 6 as viewed from the +Z direction.

The base 6, which is formed into a substantially circular shape as viewed from the +Z direction, is fixed to the casing 41. The base 6 supports the jog dial 8 so that the jog dial 8 is rotatable centered on the rotation axis Rx, and also supports the display 7 disposed inside the jog dial 8.

As shown in FIG. 3, the base 6 includes a plurality of guide ribs 61, rotation support members 62, a fixing portion 63, a braking unit 64, and a brake adjuster 65.

Details of Guide Rib

The plurality of guide ribs 61 are disposed concentrically to project in the +Z direction from a surface 6A in the +Z direction of the base 6. Specifically, the base 6 has three guide ribs 611, 612 and 613, which are sequentially disposed from an inside toward an outside.

Among the guide ribs 611 to 613, the guide rib 611 in the innermost position projects beyond the guide ribs 612, 613 in the +Z direction. A support 82, which is a part of the jog dial 8, is disposed on the inner side of the guide rib 611.

The guide rib 612, which is provided between the guide rib 613 provided in the outmost position and the guide rib 611, has cuts 6121 at every predetermined angle. A roller 621 forming each rotation support member 62 is provided in each cut 6121. In the exemplary embodiment, eight cuts 6121 in total are provided at every 45 degrees with respect to the center of the guide ribs 61. The guide rib 612 and the guide rib 613 guide the jog dial 8 to rotate and suppress the jog dial 8 from being displaced in the −Z direction from the base 6.

Details of Rotation Support Member

The rotation support members 62 support the jog dial 8 so that the jog dial 8 is rotatable. The rotation support members 62 include a plurality of rollers 621, respectively, which are rotatably provided in the respective cuts 6121.

A rotation axis of each roller 621 is set along a direction toward the center of the guide rib 611. When the jog dial 8 is rotated in a circumferential direction centered on the rotation axis Rx, each roller 621 is rotated along the circumferential direction, whereby the jog dial 8 is smoothly rotated.

Details of Fixing Portion

The fixing portion 63 is positioned in the center of the guide rib 61. The display 7 is fixed to the fixing portion 63. The fixing portion 63 includes a cylindrical portion 631 protruding in the +Z direction and a through hole 632.

The cylindrical portion 631 is inserted in the jog dial 8 to define the rotation axis Rx of the jog dial 8.

The through hole 632 penetrates the cylindrical portion 631 in the +Z direction. A later-described fitting portion 72 of the display 7 is inserted in the through hole 632 with the cylindrical portion 631 placed inside the jog dial 8. It should be noted that the through hole 632 is not a circular opening but is formed with a recess 633 that is defined radially outward from an edge of the through hole 632 in the cylindrical portion 631. A part of the fitting portion 72 is fitted into the recess 633, thereby restricting the display 7 from rotationally moving centered on the rotationally moving axis extending in the +Z direction.

Details of Braking Unit

Braking force acts on the jog dial 8 by applying a rotation load to the jog dial 8 by the braking unit 64. The braking unit 64 includes: a plurality of braking pads 641; and a disk-shaped support base 642 supporting the plurality of braking pads 641.

The plurality of braking pads 641 are brought into contact with the support 82 of the jog dial 8 to attenuate the rotational force of the jog dial 8. The plurality of braking pads 641 are provided at every predetermined angle with respect to the center of the guide rib 611. In the exemplary embodiment, three braking pads 641 in total are provided at every 120 degrees with respect to the center of the guide rib 611.

Each braking pad 641 includes: a T-shaped body (not shown) protrusible and retractable in the ±Z directions with respect to the support base 642; a contact portion 6411 provided in a +Z directional portion of the body; and a biasing portion (not shown) configured to bias the body toward the jog dial 8.

The contact portion 6411 is contactable with the jog dial 8. The contact portion 6411 is formed from, for instance, felt.

The support base 642 is a disk member movable in the ±Z directions and supports the plurality of braking pads 641. The support base 642 (not shown) is disposed on an annular rotationally moving base in a manner to be rotationally movable centered on the rotation axis Rx. The support base 642 is moved in the ±Z directions on the rotational movement of the rotationally moving base.

Details of Brake Adjuster

The brake adjuster 65 adjusts a braking force applied to the jog dial 8 by the braking unit 64. The brake adjuster 65 includes: a dial 651 to be rotated by a user; and a plurality of gears (not shown) to transmit the rotation of the dial 651.

When the dial 651 is rotated, the brake adjuster 65 transmits the rotation of the dial 651 to the support base 642 via the gears. This operation rotates the support base 642 to move in the ±Z directions. Movement in the +Z direction of the support base 642 increases a pressing force of the braking pads 641 against the jog dial 8, thereby increasing the braking force applied to the jog dial 8. On the other hand, movement in the −Z direction of the support base 642 reduces the pressing force of the braking pads 641 against the jog dial 8, thereby decreasing the braking force applied to the jog dial 8. The braking force is thus adjusted depending on the +Z directional position of the support base 642.

Details of Display

Figure 5:
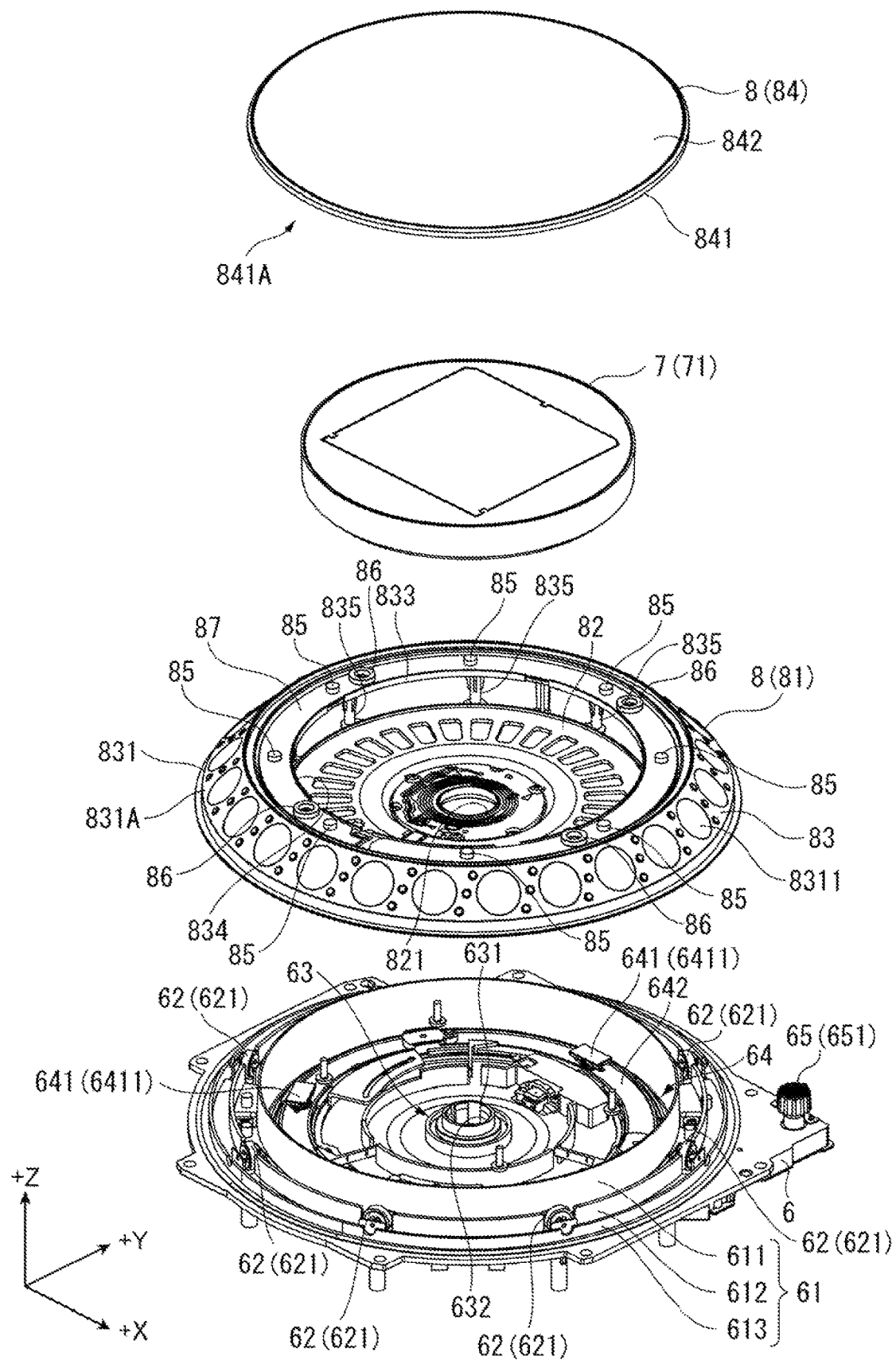
FIG. 5 is an exploded perspective view showing the jog controller in the exemplary embodiment.

FIG. 4 is a plan view of the jog controller 5 from which the top plate 84 of the jog dial 8 is removed, as viewed from the +Z direction. FIGS. 5 and 6 are exploded perspective views of the jog controller 5 as viewed from the +Z direction and the −Z direction, respectively. In FIG. 6, the base 6 is not shown.

As shown in FIG. 4, the display 7 is provided in the center of the circular jog dial 8 as viewed from the +Z direction. Moreover, as shown in FIGS. 5 and 6, the display 7 is disposed inside the jog dial 8. This display 7 includes: a display body 71 including a display panel such as a liquid crystal panel; and the fitting portion 72 protruding in the −Z direction from the display body 71 as shown in FIG. 6.

The display body 71 displays an image according to image information inputted via a flexible printed circuit board FPC. The flexible printed circuit board FPC is placed through the fitting portion 72 to extend in the −Z direction as shown in FIG. 6.

The fitting portion 72 is fitted in the through hole 632 (see FIG. 3) of the fixing portion 63. By this operation, the display 7 in a non-rotated state is fixed to the base 6, as described above. The flexible printed circuit board FPC is placed through the through hole 632 to extend in the −Z direction beyond the base 6.

Details of Jog Dial

The jog dial 8 corresponds to a rotary operator. As shown in FIG. 1, the jog dial 8 is provided to be exposed on the top surface 41A of the casing 41 and is rotated by an operator. As shown in FIGS. 5 and 6, the jog dial 8 includes a rotary body 81, a top plate 84, elastic members 85, 86, and a press detecting unit 87, the top plate 84, elastic members 85, 86, and press detecting unit 87 being provided to the rotary body 81.

Details of Rotary Body

The rotary body 81 is a main body of the jog dial 8. The rotary body 81 is disposed on the base 6 in a manner to be rotatable centered on the rotary axis Rx. The rotary body 81 includes the support 82 and the body 83.

The support 82, which is formed into a disk as viewed from the +Z direction, is disposed in the guide rib 611. A plurality of braking pads 641 are brought from the −Z direction into contact with a bottom surface 82A that is a surface of the support 82 in the −Z direction. The plurality of braking pads 641 apply a braking force on the jog dial 8 when the jog dial 8 is rotated.

The support 82 has an opening 821 in the center that is circular as viewed from the +Z direction. The cylindrical portion 631 is placed through the opening 821, whereby the rotary body 81, consequently the jog dial 8 are rotationally movable centered on the rotation axis Rx.

As shown in FIG. 6, a disk portion RD1 forming a rotation detecting unit RD for detecting rotation of the jog dial 8, and a wireless communication unit (not shown) for transmitting a pressing operation performed on the jog dial 8 to the base 6 are provided on the periphery of the opening 821.

As shown in FIGS. 5 and 6, the body 83 is formed into a flat truncated-cone shape as viewed from the +X direction or the +Y direction. The body 83 surrounds the support 82 as viewed from the +Z direction. The body 83 has a lateral portion 831, a rib 832, a step portion 833, an opening 834, and a connecting portion 835.

The lateral portion 831, which is formed into an annular shape as viewed from the +Z direction, is an inclined surface whose outer diameter is smaller toward the +Z direction. An outer surface 831A of the lateral portion 831 is provided with a plurality of recesses 8311 into which an operator can insert his/her finger(s), the recesses 8311 being provided for assisting the rotary operation of the jog dial 8. The recesses 8311 are provided at regular intervals in a circumferential direction of the outer surface 831A.

As shown in FIG. 6, the rib 832, which protrudes from an inner surface 831B of the lateral portion 831 in the −Z direction, is formed into a substantially annular shape as viewed from the −Z direction. The rib 832 of the jog dial 8 disposed in the base 6 is in contact with a plurality of rollers 621. When the jog dial 8 is rotated, the rib 832 slides on the rollers 621 in a circumferential direction of the jog dial 8, thereby decreasing slide resistance of the jog dial 8.

The step portion 833 is formed at a level one step lower in the −Z direction than an end in the +Z direction of the lateral portion 831. Specifically, the step portion 833 is an annular portion formed in a position in the −Z direction from the end of the body 83 in the +Z direction and along an XY plane in the body 83. The later-described top plate 84 is fitted in the step portion 833.

The opening 834 is defined by an inner edge of the step portion 833 into a circular shape as viewed from the +Y direction. As shown in FIG. 4, the display 7 is disposed in the opening 834. An image displayed on the display 7 is observed through the opening 834.

As shown in FIGS. 5 and 6, the connecting portion 835 connects the support 82 to the body 83. Specifically, the connecting portions 835 are provided by a plurality of bosses protruding in the −Z direction from a −Z directional surface of the step portion 833, and is fixed to the support 82. Nine connecting portions 835 in total are provided at regular intervals_centered on the center of the body 83 in the exemplary embodiment. However, the number of the connecting portions 835 is not limited thereto.

Details of Top Plate

The top plate 84 in the jog dial 8 is a pressed portion through which an operator performs a pressing operation. The top plate 84 includes an annular frame 841 and a circular-shaped light-transmitting component 842 as viewed from the +Z direction.

The light-transmitting component 842 adheres to a surface in the +Z direction of the frame 841. The top plate 84 is attached to the rotary body 81 by fixing the frame 841 to the step portion 833. As shown in FIG. 6, a surface 841A in the −Z direction of the frame 841 is provided with a plurality of recesses 8411 defined in the +Z direction to accommodate a part of the later-described elastic members 85 and a plurality of bosses 8412 protruding in the −Z direction from the surface 841A.

As shown in FIG. 5, the light-transmitting component 842 is a disk member covering the display body 71 of the display 7 in the +Z direction. The light-transmitting component 842, which is formed from a material through which an image on the display 7 can be transmitted, protects the display 7. An operator can observe the image on the display 7 via such a light-transmitting component 842.

Details of Elastic Member and Press Detecting Unit

Figure 7:
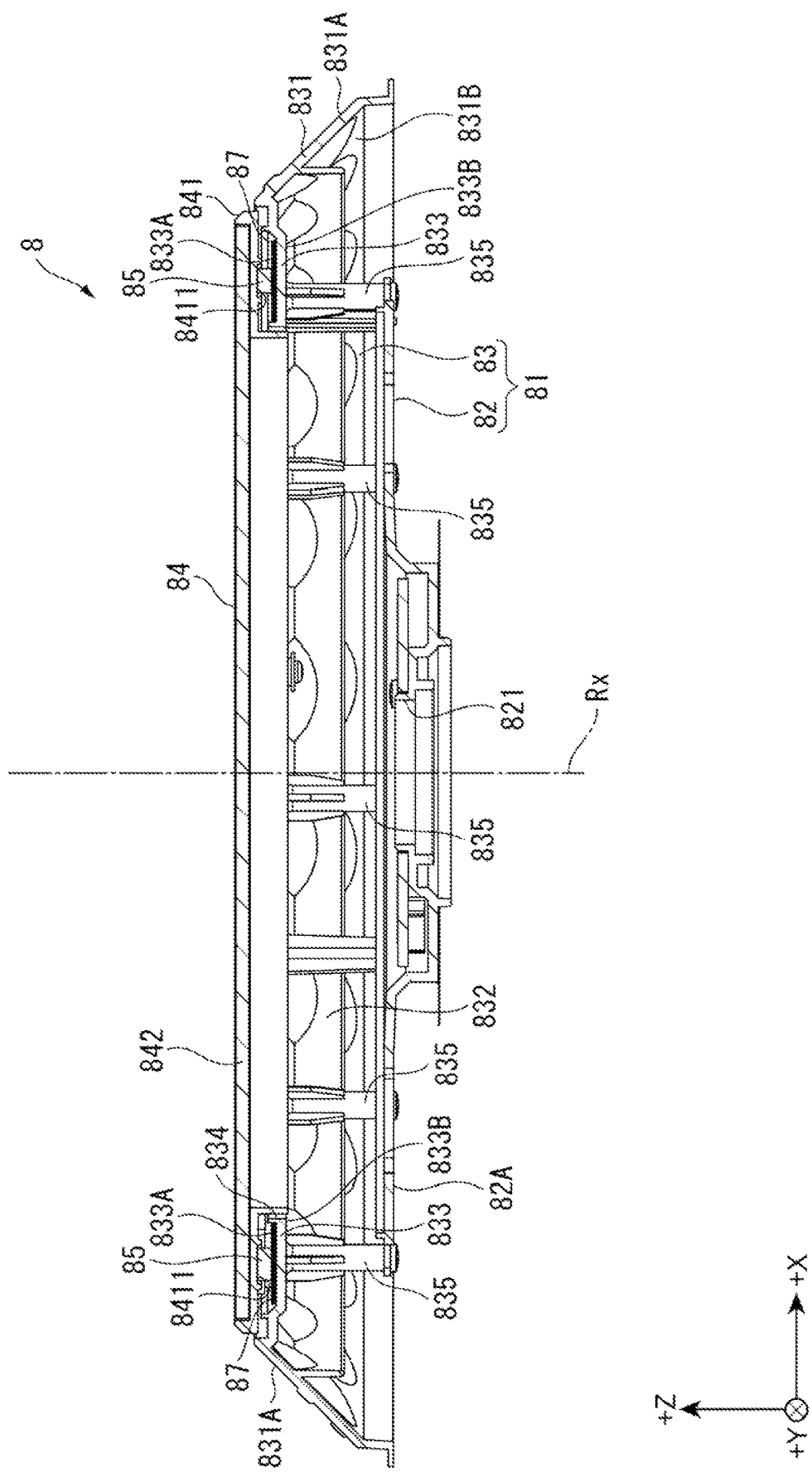
FIG. 7 is a cross-sectional view showing a jog dial in the exemplary embodiment.

FIG. 7 is a cross-sectional view of the jog dial 8. Specifically, FIG. 7 is a cross-sectional view of the jog dial 8 along an XZ plane as viewed from the −Y direction.

As shown in FIGS. 4 and 5, the elastic members 85, 86 and the press detecting unit 87 are provided between the top plate 84 and the rotary body 81. Specifically, the elastic members 85, 86 and the press detecting unit 87 are provided between the frame 841 and the step portion 833.

As shown in FIGS. 5 and 7, the elastic members 85 are provided between the press detecting unit 87 and a −Z directional surface of the frame 841. The elastic members 85 are disposed at regular intervals along a circumferential direction centered on the center of the jog dial 8 as viewed from the +Z direction. In the exemplary embodiment, the elastic members 85 are in a form of rubber cylinders. Eight elastic members 85 in total are provided at every 60 degrees with respect to the center of the jog dial 8. The elastic members 85, together with the elastic members 86, keep the frame 841 spaced above from the press detecting unit 87.

As shown in FIGS. 4 and 5, the elastic members 86 are disposed at regular intervals along a circumferential direction centered on the center of the jog dial 8 as viewed from the +Z direction. Specifically, four elastic members 86 are provided at substantially regular intervals along the circumferential direction. The elastic members 86 are each formed into an annular shape into which the boss 8412 (see FIG. 6) protruding in the −Z direction from the surface 841A of the frame 841 is insertable, as viewed from the +Z direction. The elastic members 86 are formed from an elastic material such as rubber and sponge.

The surfaces in the +Z and −Z directions of each elastic member 86 are adhesive surfaces. The elastic members 86 adhere to: the frame 841 in a +Z directional position with respect to the elastic members 86; and the press detecting unit 87 in a −Z directional position with respect to the elastic members 86. In other words, the elastic members 86 fix the frame 841 to an outside of a detection area of the press detecting unit 87 while the frame 841 is kept spaced above from the press detecting unit 87. With this disposition of the frame 841, a pressing force to be applied on the press detecting unit 87 is adjusted.

As shown in FIGS. 4, 5 and 7, the press detecting unit 87 having an annular shape is provided over substantially the whole area of a surface 833A in the +Z direction of the step portion 833 that is a part of the rotary body 81. In other words, the press detecting unit 87 is annularly provided along an outer circumference of the jog dial 8. Moreover, the press detecting unit 87 is provided between the body 83 of the rotary body 81 and the top plate 84. The press detecting unit 87 may be provided, for instance, by a resistive film type sheet switch or any other pressure detecting unit such as a pressure sensitive sensor or a tact switch.

The press detecting unit 87 detects a pressing operation performed on the top plate 84 (i.e., pressed portion) by an operator. Specifically, the press detecting unit 87 detects a pressure transmitted via the elastic members 85, 86 from the top plate 84 and outputs a signal indicating a change in the pressure. In other words, the press detecting unit 87 outputs a signal indicating that the top plate 84 has been pressed by a user.

Effects of Exemplary Embodiment(s)

The above-described playback system 1 according to the exemplary embodiment can provide effects as follows.

The jog controller 5 of the DJ controller 4 (i.e., acoustic device) includes the jog dial 8 (i.e., operation unit) and the base 6 supporting the jog dial 8 so that the jog dial 8 is rotatable. The jog dial 8 includes: the rotary body 81 disposed on the base 6; and the top plate 84 (i.e., pressed portion) provided on the rotary body 81 and on which a pressing operation is performed; the press detecting unit 87 provided to the rotary body 81 along the outer circumference of the jog dial 8 and configured to detect a pressing operation performed on the top plate 84 by an operator; and the elastic members 85, 86 interposed between the top plate 84 and the press detecting unit 87.

This configuration can reduce a weight of the components disposed on the press detecting unit 87 as compared with a configuration in which the press detecting unit is provided under the jog dial. Accordingly, the components disposed on the press detecting unit 87 can be suppressed from vibrating significantly due to music and the like at a site where the DJ controller 4 is placed, so that the press detecting unit 87 can be suppressed from detecting vibration as a pressing operation by the operator. Accordingly, a detection sensitivity of the press detecting unit 87 can be improved, so that the pressing operation performed on the top plate 84 by the operator is appropriately detectable.

A pressing force applied on the top plate 84 by the operator acts on the press detecting unit 87 via the elastic members 85, 86 interposed between the top plate 84 and the press detecting unit 87. With this action, regardless of which part of the top plate 84 is pressed, a pressing force applied on the top plate 84 concentrates on positions of the elastic members 85, 86 disposed on the press detecting unit 87. Accordingly, the press detecting unit 87 can reliably detect that the top plate 84 has been pressed.

The base 6 includes rollers 621 rotatably provided to the base 6 and supporting the jog dial 8.

With this configuration, the jog dial 8 can be stably rotated by the rollers 621 that are to rotate in conjunction with the rotation of the jog dial 8.

The jog controller 5 includes the display 7 in a position different from the position of the press detecting unit 87 disposed, as viewed from a side opposite to the base 6 with respect to the jog dial 8.

With this configuration, the display 7 can present various information to an operator. In this case, the display 7 is provided in the position different from the position of the press detecting unit 87 disposed, which can suppress the display 7 from interfering with the press detecting unit 87. Accordingly, the press detecting unit 87 can appropriately detect the pressing operation by an operator.

The press detecting unit 87 is annularly provided along the outer circumference of the jog dial 8. The display 7 is provided on the inner side of the press detecting unit 87, as viewed from the side opposite to the base 6 with respect to the jog dial 8.

With this configuration, the display 7 can be reliably suppressed from interfering with the press detecting unit 87.

In addition, since the press detecting unit 87 is annularly provided along the outer circumference of the jog dial 8, the press detecting unit 87 can easily detect a pressing operation of an operator regardless of which position of the top plate 84 the operator presses.

Modification(s) of Exemplary Embodiment(s)

The invention is not limited to the above exemplary embodiment but includes any modification, improvements, and the like as long as an object of the invention can be achieved.

In the exemplary embodiment, a plurality of elastic members 85, 86 are provided between the top plate 84 and the press detecting unit 87 at regular intervals along the outer circumference of the jog dial 8. Each elastic member 85 is shaped into a solid cylinder. Each elastic member 86 is shaped annular. However, the shapes of the elastic members 85, 86 are not limited to the above. Each elastic member 85 may be shaped into a flat plate and each elastic member 86 may be shaped into a rectangular frame. Alternatively, an elastic member having a shape and a size enough for completely covering the press detecting unit 87 as viewed from the +Z direction may be used in place of the elastic members 85, 86. In other words, the press detecting unit 87 may be completely covered with at least one elastic member as viewed from the +Z direction.

The jog dial 8 does not necessarily include both the elastic members 85, 86. The jog dial 8 only needs to include at least one of the elastic members 85 or the elastic members 86.

In the above exemplary embodiment, the press detecting unit 87 is annularly provided inside the jog dial 8 and along the outer circumference of the jog dial 8. However, the press detecting unit 87 is not limited to the above. Any press detecting unit capable of detecting a pressing operation performed on the jog dial by an operator is usable. The press detecting unit 87 is not necessarily a single annular press detecting unit but may be provided by a plurality of press detecting units. In this case, a plurality of press detecting units may be disposed, for instance, at regular intervals along the outer circumference of the jog dial 8. Also in this case, the elastic members may be interposed between the press detecting units and the top plate 84 (i.e., pressed portion) in a manner to correspond to positions where the press detecting units are disposed.

In the above exemplary embodiment, the top plate 84 includes the frame 841 and the light-transmitting component 842 fitted in the frame 841, and is formed circular as viewed from the +Z direction. However, the top plate as the pressed portion is not limited to the above, but may be a single plate member. In a case where the display 7 is not provided inside the body 83 as viewed from the +Z direction, the top plate 84 may include, in place of the light-transmitting component 842, a plate member that does not transmit light.

In the above exemplary embodiment, the base 6 includes the rotation support member 62 supporting the jog dial 8 so that the jog dial 8 is rotatable, and the rotation support member 62 includes a plurality of rollers 621. However, the base 6 is not limited to the above, but may not include the rollers 621. In this case, for instance, the cylindrical portion 631 defining the rotation axis Rx of the jog dial 8 may be inserted into the opening 821 to support the jog dial 8 so that the jog dial 8 is rotatable.

A rotation axis of each roller 621 does not have to be directed toward the center of the guide rib 61 as long as the rollers 621 do not interfere with the rotation of the jog dial 8.

In the above exemplary embodiment, the display 7 is provided in the center of the jog dial 8 as viewed from the +Z direction. However, the display 7 is not limited to the above, but may be provided in another part of the jog dial 8, or the display 7 does not have to be provided.

In the above exemplary embodiment, an acoustic device where the jog controller 5 is provided is exemplified by the DJ controller 4 shown in FIG. 1. However, the configuration of the acoustic device is not limited to the above that is the configuration and the layout shown in FIG. 1. For instance, the acoustic device does not have to include both of the left deck 43L and right deck 43R or may include only the jog controller 5.

The invention claimed is:

1. An acoustic device comprising:
   a rotary operator; and
   a base supporting the rotary operator so that the rotary operator is rotatable,
   the rotary operator comprising:
      a rotary body rotatably provided on the base;
      a top plate provided on the rotary body and on which a pressing operation is performed;
      a press detecting unit provided on the rotary body and disposed between the rotary body and the top plate along an outer circumference of the rotary operator, the press detecting unit being configured to detect the pressing operation performed on the top plate; and
      an elastic member interposed between the top plate and the press detecting unit,
   wherein the top plate presses the press detecting unit via the elastic member when the pressing operation is performed on the top plate, and
   wherein the top plate directly presses the elastic member.

2. The acoustic device according to claim 1, wherein the base comprises a roller rotatably provided to the base and supporting the rotary operator.

3. The acoustic device according to claim 1, wherein the elastic member directly presses the press detecting unit.

4. The acoustic device according to claim 1, further comprising:
   a display in a position different from a position where the press detecting unit is disposed, as viewed from a side opposite to the base with respect to the rotary operator.

5. The acoustic device according to claim 4, wherein the press detecting unit is annularly provided along the outer circumference of the rotary operator, and
   the display is provided inside the press detecting unit, as viewed from the side opposite to the base with respect to the rotary operator.

6. The acoustic device according to claim 1, wherein the rotary body has an annular step portion,
   the press detecting unit is provided on the step portion, and
   the top plate is provided on the step portion.

7. The acoustic device according to claim 6, wherein the press detecting unit is provided on a surface of the step portion opposing the top plate.

\* \* \* \* \*